United States Patent
Nainar et al.

(10) Patent No.: US 10,574,561 B2
(45) Date of Patent: Feb. 25, 2020

(54) CENTRALIZED ERROR TELEMETRY USING SEGMENT ROUTING HEADER TUNNELING

(71) Applicant: Cisco Technology, Inc., San Jose, CA (US)

(72) Inventors: Nagendra Kumar Nainar, Morrisville, NC (US); Carlos M. Pignataro, Cary, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 211 days.

(21) Appl. No.: 15/724,396

(22) Filed: Oct. 4, 2017

(65) Prior Publication Data

US 2019/0104048 A1 Apr. 4, 2019

(51) Int. Cl.
| | | |
|---|---|---|
| G06F 15/16 | (2006.01) |
| H04L 12/751 | (2013.01) |
| G06F 11/30 | (2006.01) |
| G06F 11/34 | (2006.01) |
| G06F 11/10 | (2006.01) |
| H04L 12/755 | (2013.01) |
| H04L 12/715 | (2013.01) |

(Continued)

(52) U.S. Cl.
CPC .......... *H04L 45/02* (2013.01); *G06F 11/1076* (2013.01); *G06F 11/302* (2013.01); *G06F 11/3466* (2013.01); *H04L 45/021* (2013.01); *G06F 11/0709* (2013.01); *G06F 11/0754* (2013.01); *G06F 11/3065* (2013.01); *G06F 2201/86* (2013.01); *H04L 45/64* (2013.01); *H04L 45/74* (2013.01)

(58) Field of Classification Search
CPC ...................................................... H04L 45/74
See application file for complete search history.

(56) References Cited

U.S. PATENT DOCUMENTS 5,568,477 A * 10/1996 Galand .................. H04L 49/30
370/229
6,317,433 B1 * 11/2001 Galand ................. H04J 3/1688
370/395.2

(Continued)

FOREIGN PATENT DOCUMENTS

| CN | 101621439 A | 1/2010 |
| CN | 102932230 B | 7/2015 |

OTHER PUBLICATIONS

S. Previdi, Ed., et al., "IPv6 Segment Routing Header (SRH)", draft-ietf-6man-segment-routing-header-05, Network Working Group, Feb. 1, 2017, 28 pgs.

*Primary Examiner* — Hieu T Hoang
(74) *Attorney, Agent, or Firm* — Edell, Shapiro & Finnan, LLC

(57) ABSTRACT

A network device receives a data packet including a source address and a destination address. The network device drops the data packet before it reaches the destination address and generates an error message indicating that the data packet has been dropped. The network device encapsulates the error message with a segment routing header comprising a list of segments. The first segment of the list of segments in the segment routing header identifies a remote server. The network device sends the encapsulated error message to the remote server based on the first segment of the segment routing header.

20 Claims, 7 Drawing Sheets

(51) Int. Cl.
*G06F 11/07* (2006.01)
*H04L 12/741* (2013.01)

(56) References Cited

U.S. PATENT DOCUMENTS

| | | | | |
|---|---|---|---|---|
| 6,601,217 B1* | 7/2003 | Smith | ................... | H04L 1/0061 |
| | | | | 714/748 |
| 9,026,862 B2 | 5/2015 | Dreyfoos et al. | | |
| 10,320,683 B2* | 6/2019 | Pfister | ..................... | H04L 69/22 |
| 2004/0117794 A1* | 6/2004 | Kundu | ................... | G06F 9/505 |
| | | | | 718/102 |
| 2006/0050705 A1* | 3/2006 | Kim | ................... | H04L 29/06027 |
| | | | | 370/392 |
| 2007/0030821 A1* | 2/2007 | Iwamura | ........... | H04L 29/06027 |
| | | | | 370/328 |
| 2007/0081536 A1* | 4/2007 | Kim | .................... | G10L 19/0017 |
| | | | | 370/392 |
| 2014/0126354 A1* | 5/2014 | Hui | ........................ | H04L 69/40 |
| | | | | 370/225 |
| 2014/0269266 A1* | 9/2014 | Filsfils | .................... | H04L 43/50 |
| | | | | 370/228 |
| 2014/0269699 A1* | 9/2014 | Filsfils | ................... | H04L 41/12 |
| | | | | 370/389 |
| 2015/0109902 A1* | 4/2015 | Kumar | ................ | H04L 41/0668 |
| | | | | 370/219 |
| 2015/0188885 A1* | 7/2015 | Jager | .................... | H04L 63/0236 |
| | | | | 726/13 |
| 2015/0288621 A1* | 10/2015 | Field | ..................... | H04L 49/253 |
| | | | | 709/223 |
| 2016/0099864 A1* | 4/2016 | Akiya | .................... | H04L 45/28 |
| | | | | 370/216 |
| 2016/0205594 A1* | 7/2016 | Savolainen | ....... | H04W 52/0251 |
| | | | | 370/311 |
| 2016/0366052 A1* | 12/2016 | Chapman | ................ | H04L 45/66 |
| 2017/0093685 A1 | 3/2017 | Retana et al. | | |
| 2017/0339072 A1* | 11/2017 | Pignataro | ............. | H04L 49/3009 |
| 2018/0034727 A1* | 2/2018 | Nainar | .................... | H04L 45/28 |
| 2018/0219783 A1* | 8/2018 | Pfister | ...................... | H04L 45/34 |
| 2018/0278548 A1* | 9/2018 | Pignataro | ................ | H04L 69/22 |
| 2018/0375684 A1* | 12/2018 | Filsfils | ................ | H04L 12/4633 |
| 2019/0036818 A1* | 1/2019 | Nainar | .................... | H04L 45/74 |

* cited by examiner

CENTRALIZED ERROR TELEMETRY USING SEGMENT ROUTING HEADER TUNNELING

TECHNICAL FIELD

The present disclosure relates to error handling in computer networking.

BACKGROUND

Computer network telemetry data can provide information enabling network administrators to quickly diagnose and correct issues with network connectivity. Some out-of-band mechanisms collect different node and network related data (e.g., resource utilization), but do not capture data on node-to-node communications. For instance, Internet Control Message Protocol (ICMP) messages play a role in any network to communicate error/informational messages between nodes including Path Maximum Transmission Unit Discovery (PMTUD), Time-To-Live (TTL) expiry, parameter problems, Duplicate Address Detection (DAD), and/or neighbor discovery. In these examples, the transit network nodes directly send the error/informational messages to the original source address without the network operator obtaining a full view of the error/informational exchanges between different nodes.

Typical ICMP messages are generated at a transit node and sent to the original source of the packet, and are not included in typical telemetry available for network analysis. Network analysis is typically performed by reviewing ICMP error counters on transit nodes, which provide limited information on how many packets were dropped for, e.g., TTL expiry or Packet Too Big (PTB) errors in which a received packet is larger than the maximum transmission unit of the transit node. Some transit nodes may provide Netflow export data under some conditions, but neither error counters nor Netflow collection provides sufficiently granular telemetry information to completely characterize network operations.

DESCRIPTION OF EXAMPLE EMBODIMENTS

Overview

A computer-implemented method is provided for a network device to provide error telemetry to a remote server. The method comprises receiving a data packet at the network device. The data packet includes a source address and a destination address. The method also includes dropping the data packet before it reaches the destination address and generating an error message indicating that the data packet has been dropped. The method further includes encapsulating the error message with a segment routing header comprising a plurality of segments. A first segment of the plurality of segments identifies a remote server. The method also includes sending the encapsulated error message to the remote server based on the first segment of the segment routing header.

DETAILED DESCRIPTION

Packets transmitted with a Segment Routing Header (SRH) may be directed to network/computing nodes along specific routes. In some examples, segments in the SRH may direct the computing nodes to perform specific actions as the packet traverses the route specified by the segments in the SRH. The techniques presented herein leverage the SRH and tunnel error/informational messages to the original source via a remote server (e.g., a telemetry server) that may be controlled by the network operator. These techniques may be widely applied on packets transmitted according to a number of different protocols, such as Internet Protocol (IP) version 4 (IPv4), IPv6, Segment Routing (SR) for IPv6 (SRv6), Multiprotocol Label Switching (MPLS), and/or Service Function Chaining (SFC). The benefits and properties of using the SRH are leveraged in a pipeline into the remote server as a sink for logging.

Local exceptions or packet drops are typically counted and are potentially exported, but with little or no details about the reasons behind the packet error/drop. The techniques presented herein leverage the metadata capability of a service chain (e.g., Type-Value-Length fields in SRv6, Network Service Header (NSH) in SFC) to convey additional details about the drops/errors from the network device to a remote server that helps the network operator/controller obtain a holistic view of the error reporting to take necessary action on the network.

Figure 1:
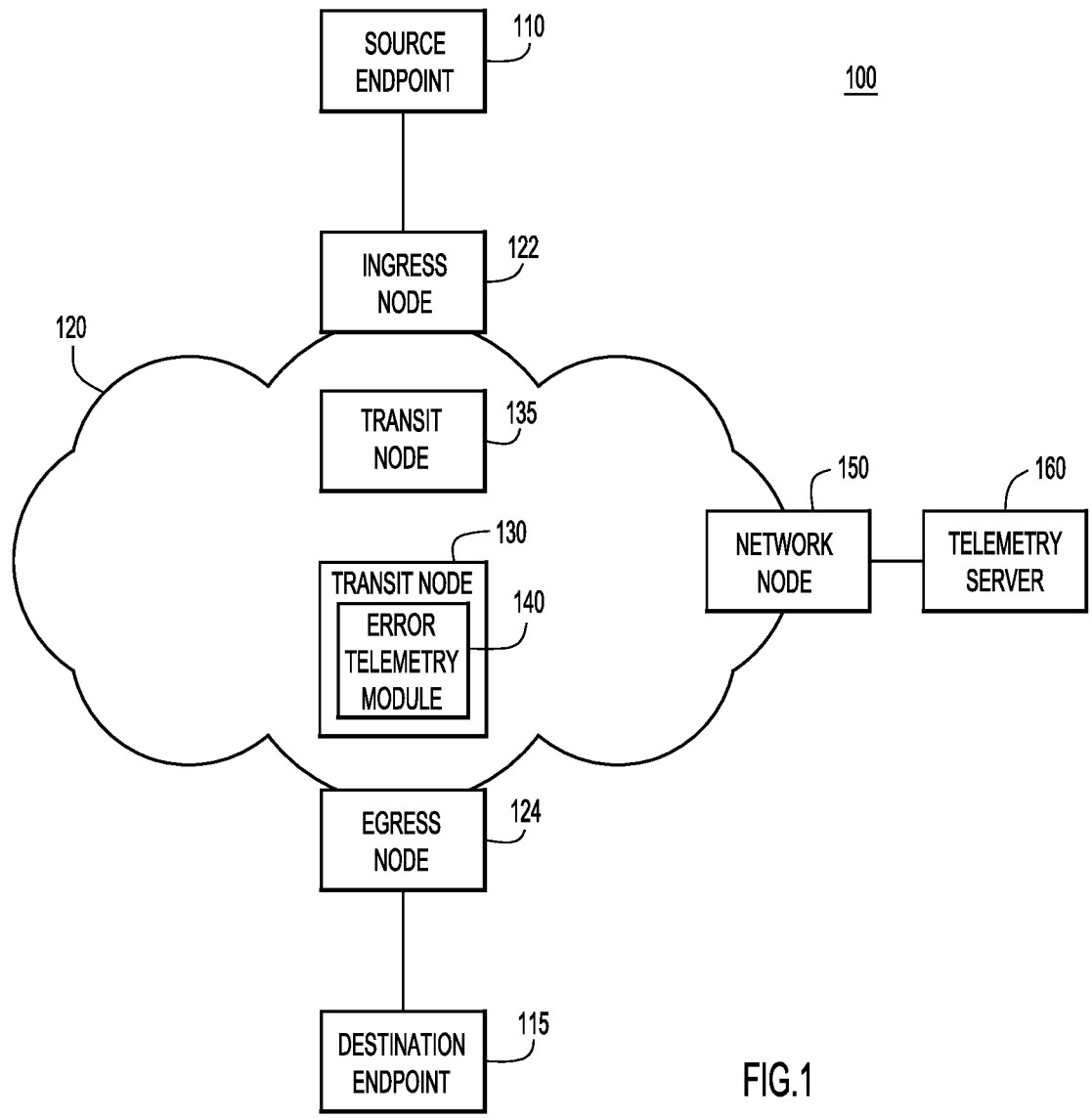
FIG. 1 is a simplified block diagram of a system for collecting telemetry information from transit nodes between a source endpoint and a destination endpoint, according to an example embodiment.

Referring now to FIG. 1, a network system 100 is shown that is configured to provide error telemetry to the network operator. The system 100 includes a source endpoint 110 that sends a data packet to a destination endpoint 115 over a network 120. The source endpoint 110 sends the data packet into the network 120 through an ingress network node 122. An egress network node 124 connects to the destination endpoint 115 and may send any data packets from the network 120 to the destination endpoint 115. Within the network 120, transit network nodes 130 and 135 convey packets between the ingress node 122 and the egress node 124. The transit node 130 includes an error telemetry module 140 for handling error conditions, e.g., dropped packets. The network 120 also includes a network node 150 that connects to a remote server 160 that is configured as a telemetry server.

In one example, the source endpoint 110 and the destination endpoint 115 may be any type of computing elements that are configured to communicate with each other over the network 120. For instance, the source endpoint 110 and the destination endpoint 115 may be desktop computers, laptop computers, smart phones, servers, virtual machines, client applications, server applications, or embedded systems. Additionally, the source endpoint 110 may be connected to the ingress node 122 of the network 120 via one or more additional network elements that are not shown in FIG. 1. Similarly, the destination endpoint 115 may be connected to the egress node 124 via one or more additional network elements.

The network nodes of network 120 may be connected in various different topologies, such as ring, mesh, star, leaf/spine, tree, and/or bus topologies. Additionally, the network nodes of network 120 may communicate through one or more networking protocols, such as IPv4, IPv6, MPLS, Segment Routing (SR), Transport Control Protocol (TCP), and/or User Datagram Protocol (UDP). The network 120 is shown in FIG. 1 comprising ingress node 122, egress node 124, transit node 130, transit node 135, and network node 150, but may include more or fewer network nodes. In another example, the functions of the transit node 130 may also be configured in the ingress node 122, the egress node 124, the transit node 135, and/or the network node 150.

In another example, the network nodes of the network 120 support routing packets with Segment Routing. The remote server 160 also may support Segment Routing by processing packets received at the remote server 160 that are encapsulated with an SRH. The SRH may include a segment in the segment list of the SRH that causes the remote server to process the payload of the encapsulated packet (e.g., store a copy of the payload) before forwarding the encapsulated packet to an address in the next segment of the segment list. Alternatively, a bit in the SRH (i.e., a flag) may signal the remote server to store a local copy of the payload message before forwarding the encapsulated message.

Figure 2:
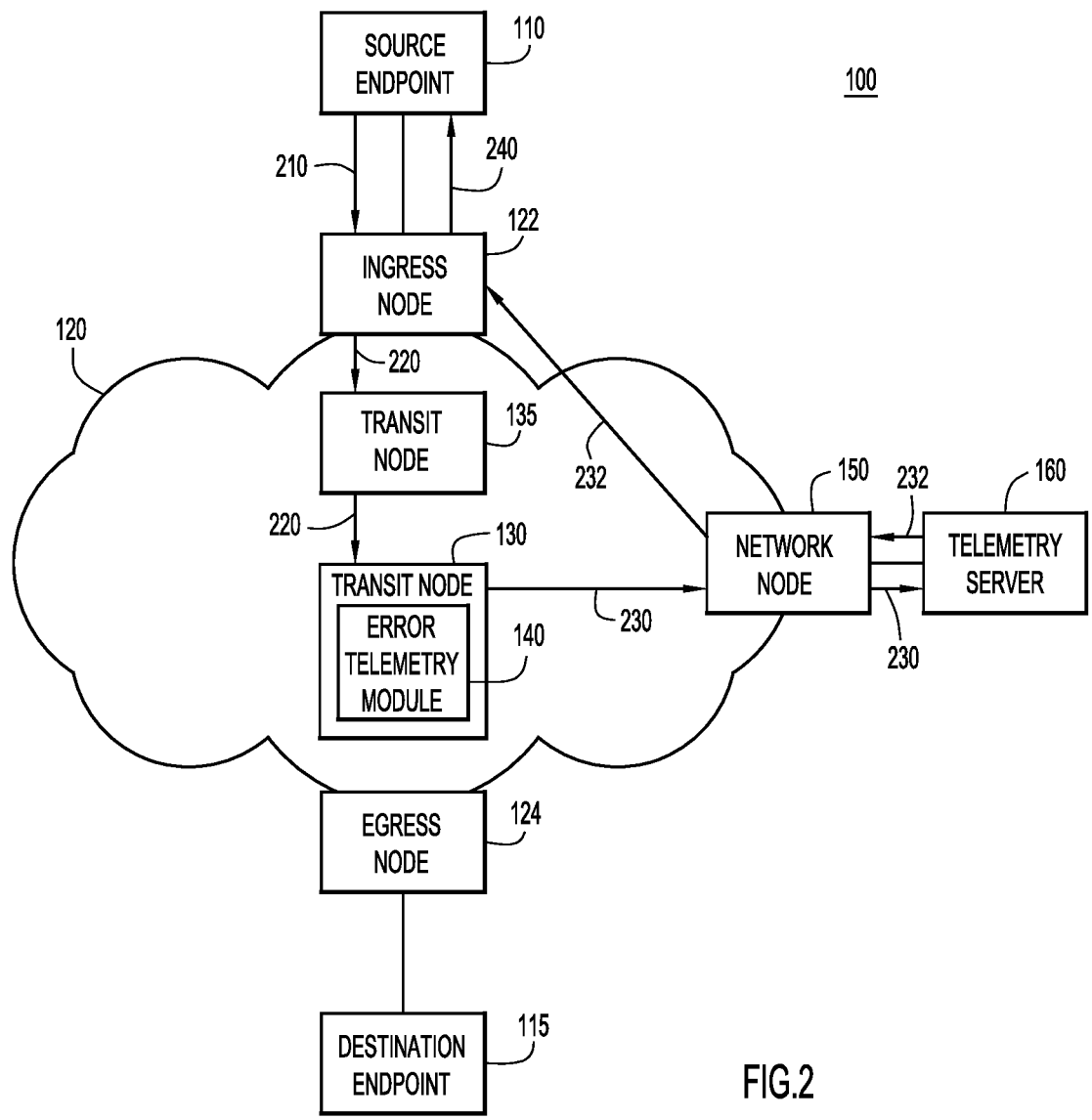
FIG. 2 is a simplified block diagram of a system for reporting a packet drop by a transit node to the source endpoint via a telemetry server, according to an example embodiment.

Referring now to FIG. 2, a simplified block diagram shows the message flow in the system 100 when a packet sent from the source endpoint 110 is dropped in transit to the destination endpoint 115. The source endpoint 110 sends a packet 210 to the ingress node 122 of the network 120. The ingress node 122 may encapsulate the packet 210 with a header (e.g., an SRH or Network Service Header (NSH)) to generate a packet 220. The ingress node 122 sends the packet 220 toward the egress node 124 via the transit nodes 135 and 130. At the transit node 130, the packet 220 is dropped (e.g., PTB, TTL expiry, etc.), and the transit node 130 generates an error message 230. The error message 230 is tunneled to the telemetry server 160, which processes the error message 230.

After processing the error message 230, the telemetry server 160 rewrites the destination address of the SRH according to the next segment in the segment list to generate an error message 232 that is directed toward the source of the packet that was dropped. The telemetry server 160 sends the error message 232 back to the ingress node 122 via the network node 150. The ingress node 122 may strip the SRH from the error message 232 and forward the underlying error message 240 to the source endpoint 110.

In one example, the underlying error message 240 is an ICMP message 240 generated by the transit node 130 when the packet 220 is dropped. The transit node 130 adds the SRH to generate the error message 230 with the ICMP message 240 as the payload of the error message 230. The error message 230 may also include some or all of the dropped packet 220 to provide further information to the telemetry server 160.

In another example, any of the network nodes in network 120 may be configured to, on generating an error/informational message (e.g., an ICMPv4 or ICMPv6 message) for other overlay/underlay technologies (e.g., SFC), encapsulate the message with an SRH. The SRH may include a segment list with a plurality of segments in an order that directs the error/informational message to the telemetry server 160 first. Other segments in the segment list of the SRH may direct the telemetry server 160 to record some or all of the message payload and/or direct the message toward the source endpoint 110.

In a further example, the telemetry server 160 is enabled to process SRH-encapsulated message 230 and will be instructed to store a copy of any received ICMP messages. The telemetry server 160 may be instructed to store the copy using a flag in the SRH or as a specific segment in the segment list. Alternatively, the telemetry server 160 may be configured to simply store a copy of any ICMP messages it receives. In this case, irrespective of the ultimate destination of the ICMP message, the telemetry server 160 will store a copy of the message for processing/analysis. All transit nodes in the network domain 120 will be configured to "tunnel" the error/informational message to the source (e.g., source endpoint 110) via the telemetry server 160. In other words, the transit node 130 will push a SRH on to the locally generated ICMP error message with a segment list of {telemetry server 160; source endpoint 110}.

In still another example, the encapsulated error message 230 may act as a proxy for the error message 240 in scenarios where the underlay node is not configured to process messages from the overlay and cannot send the error message 240 directly. For instance, transit node 130 may be acting as a transit underlay connecting overlay nodes (e.g., Service Function Forwarders or Bit Indexed Explicit Replication nodes) and drop the packet 220 without being able to interpret the packet 210. Instead of silently dropping the packet 220, the transit node 130 may forward some or all of the packet 210 to the telemetry server 160 with a relevant flag in a header or metadata that may be used by the telemetry server to generate relevant error messages back to the source endpoint 110. This enables the incremental implementation of any such overlay/underlay networks. With various overlay/underlay combination topologies and a need for tight control of Data Center traffic, the techniques presented herein allow built-in error reporting to a centralized server.

Figure 3:
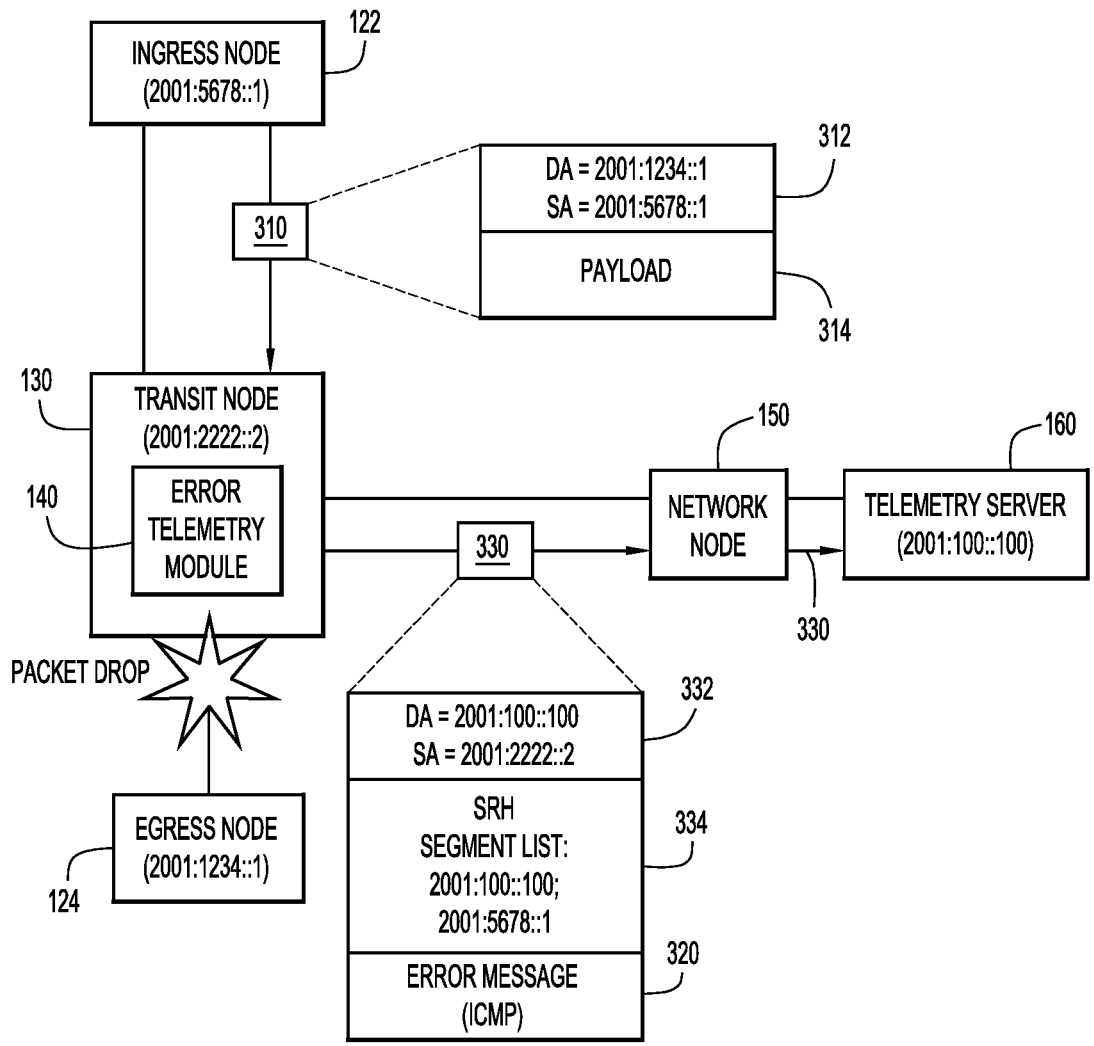
FIG. 3 illustrates a data packet being dropped and an error message being generated and propagated to the telemetry server, according to an example embodiment.

Referring now to FIG. 3, a simplified block diagram shows the error telemetry process in the network 120 as a packet is dropped by a transit node. The ingress node 122 of the network 120 sends a packet 310 to a transit node 130. The packet 310 includes an address header 312 with a destination address (e.g., 2001:1234::1) corresponding to the egress node 124 and a source address (e.g., 2001:5678::1) corresponding to the ingress node 122. The packet 310 also includes a payload 314. In one example, the payload 314 may be a packet received from a source endpoint, which is not shown in FIG. 3. The packet 310 may be formatted according to any protocol, such as IPv4, IPv6, SRv6, MPLS, or SFC.

After the packet 310 reaches the transit node 130, the transit node 130 drops the packet 310 based on an error condition associated with the packet 310. For instance, the packet 310 may be too big to forward at this time, or the TTL may have expired for the packet 310. The transit node 130 generates an error message 320, such as an ICMP message indicating that the packet 310 has been dropped. In one example, the error message includes additional information regarding the conditions and parameters that lead the packet 310 to be dropped (e.g., the source/destination of the packet, the reason for dropping the packet, the time the packet was dropped, and/or protocol-specific information, such as an MPLS label).

The error message 320 is encapsulated to generate an encapsulated error packet 330. The encapsulated packet includes an address header 332, an SRH 334, and the error message 320. The SRH 334 includes a segment list comprising a first segment with an address (e.g., 2001:100::100) associated with the telemetry server 160 and a second segment with an address (e.g., 2001:5678::1) associated with the ingress node 122. The source address of the address header 332 is populated with an address (e.g., 2001:2222::2) associated with the transit node 130. The destination address of the address header 332 is first populated with the address in the first segment of the segment list in the SRH 334, causing the packet 330 to be directed to the telemetry server 160 via the network node 150. The subsequent segments in the segment list of the SRH 334 may direct the telemetry server 160 to copy/store the error message payload 320 before rewriting the destination header 332 with the address of the ingress node 122, which is included in the second segment of the segment list.

Figure 4:
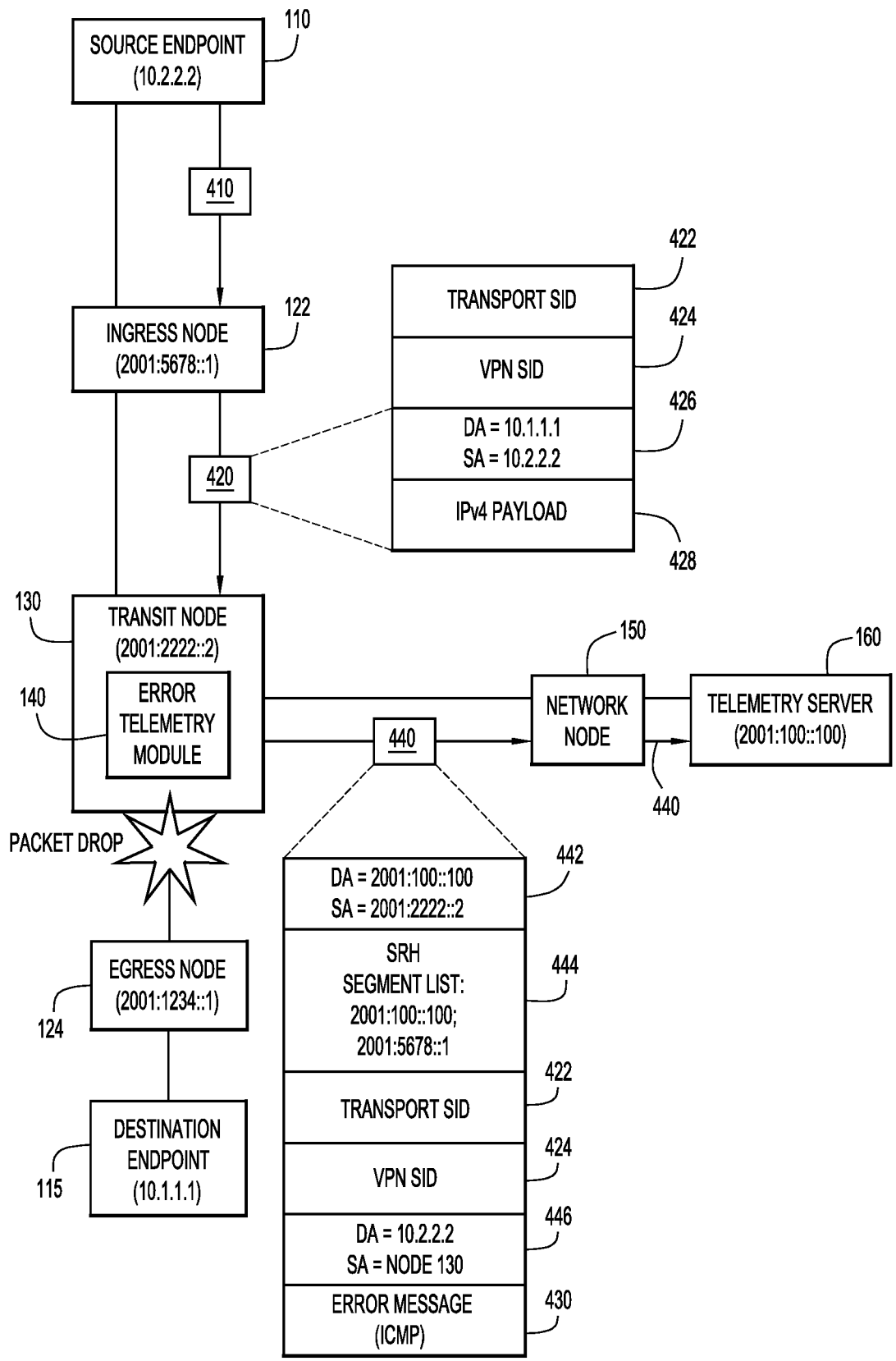
FIG. 4 illustrates a data packet in an IPv4 Virtual Private Network (VPN) being dropped and an error message being generated and propagated to the telemetry server, according to an example embodiment.

Referring now to FIG. 4, a simplified block diagram shows a use case scenario in which a packet is sent in a Virtual Private Network (VPN) through the network 120. The source endpoint 110 sends a VPN packet 410 to the ingress node 122, which encapsulates the packet 420 for transport across the network 120. The packet 420 includes a transport service identifier (SID) 422, a VPN SID 424, an IPv4 address header 426, and an IPv4 payload 428. The IPv4 address header 426 includes a destination address (e.g., 10.1.1.1) associated with the destination endpoint 115 and a source address (e.g., 10.2.2.2) associated with the source endpoint 110.

After the packet 420 reaches the transit node 130, the transit node 130 drops the packet 420 based on an error condition associated with the packet 420. For instance, the packet 420 may be too big to forward at this time, or the TTL may have expired for the packet 310. The transit node 130 generates an error message 430, such as an ICMP message indicating that the packet 420 has been dropped.

The error message 430 is encapsulated to generate an encapsulated error packet 440. The encapsulated packet 440 includes an address header 442, an SRH 444, the transport SID 422, the VPN SID 424, a rewritten IPv4 address header 446, and the error message 430. The SRH 444 includes a segment list comprising a first segment with an address (e.g., 2001:100::100) associated with the telemetry server 160 and a second segment with an address (e.g., 2001:5678::1) associated with the ingress node 122. The source address of the address header 442 is populated with an address (e.g., 2001:2222::2) associated with the transit node 130. The destination address of the address header 442 is first populated with the address in the first segment of the segment list in the SRH 444, causing the packet 330 to be directed to the telemetry server 160 via the network node 150.

In one example, the subsequent segments in the segment list of the SRH 444 may direct the telemetry server 160 to copy/store the error message payload 430 before rewriting the address header 442 with a destination address associated with the ingress node 122, which is included in the second segment of the segment list. Once the encapsulated error packet reaches the ingress node 122, the address header 442 and SRH 444 may be removed and the error message 430 is directed to the source endpoint 110 by the rewritten IPv4 header 446. Alternatively, the VPN SID 424 may cause the error message to be directed to the source endpoint 110. In other words, the segment list of the SRH 444 may include a first segment directing the encapsulated error packet 440 to the telemetry server 160 and a second segment identifying the VPN SID 424.

Figure 5:
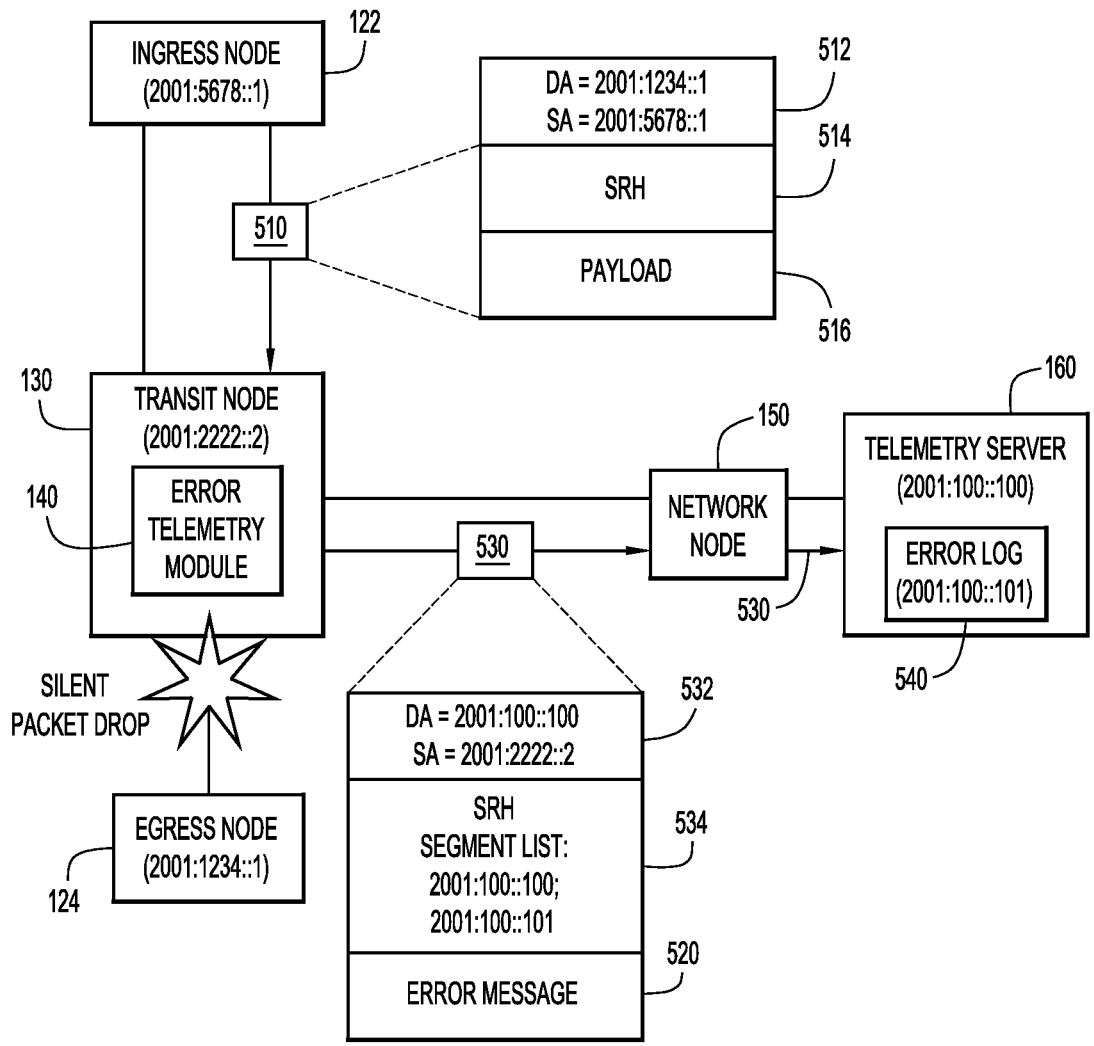
FIG. 5 illustrates an IPv6 packet being silently dropped and an error message being generated and propagated to the telemetry server, according to an example embodiment.

Referring now to FIG. 5, a simplified block diagram shows a use case scenario in which a packet is silently dropped (e.g., a drop that does not generate an ICMP message) in the network 120. The ingress node 122 of the network 120 sends a packet 510 to a transit node 130. The packet 510 includes an address header 312 with a destination address (e.g., 2001:1234::1) corresponding to the egress node 124 and a source address (e.g., 2001:5678::1) corresponding to the ingress node 122. The packet 510 also includes an SRH 514 to direct the packet 510 through the network 120. The packet 510 further includes a payload 516. In one example, the payload 516 may be a packet received from a source endpoint, which is not shown in FIG. 5.

After the packet 510 reaches the transit node 130, the transit node 130 drops the packet 510 based on an error condition associated with the packet 510. In this example, the error condition causes the transit node 130 to silently drop the packet 510, such as egress buffering or other local resource issues. In other words, the error condition would not normally be reported back to the source of the packet. The transit node 130 generates an error message 520 indicating that the packet 510 has been dropped. In one example, the error message includes additional information regarding the conditions and parameters that lead the packet 510 to be dropped (e.g., the source/destination of the packet, the reason for dropping the packet, the time the packet was dropped, and/or protocol-specific information, such as an MPLS label).

The error message 520 is encapsulated to generate an encapsulated error packet 530. The encapsulated packet includes an address header 532, an SRH 534, and the error message 520. The SRH 534 includes a segment list comprising a first segment with an address (e.g., 2001:100::100) associated with the telemetry server 160 and a second segment with an address (e.g., 2001:100::101::1) associated with an error log function 540 on the telemetry server 160. In one example, the error log 540 is part of a telemetry database that may be stored on the remote server 160. The source address of the address header 532 is populated with an address (e.g., 2001:2222::2) associated with the transit node 130. The destination address of the address header 532 is populated with the address in the first segment of the segment list in the SRH 534, causing the packet 530 to be directed to the telemetry server 160 via the network node 150. The second segment in the segment list of the SRH 534 directs the telemetry server 160 to copy/store the error message payload 520 in the error log 540 along with any further information about the silent drop provided by the SRH 534.

In one example, information indicating/describing the reason for dropping the packet 510 may be included in Type-Value-Length (TLV) fields in the SRH 534. Additionally, the segment list in the SRH 534 may end with a segment that explicitly causes the telemetry server 160 to drop the error packet 530. The drop reason for a packet that is silently dropped will be provided to the telemetry server 160 without providing new information to the original source. This behavior appears identical to the outside source of the packet, but provides the network operator with increased visibility into the functioning of the network 120.

With continuing reference to FIGS. 3-5, the segments in the segment lists of the SRHs 334, 444, and 534 have been described using addresses, such as an address associated with the telemetry server 160, an address associated with the ingress node 122, and an address associated with the error log 540. However, the segments may instead comprise instructions to be followed in processing the encapsulated error packet. For instance, the segment list in an SRH may include an instruction to send the error packet to the telemetry server 160, an instruction to record the error message in the telemetry server 160, and an instruction to send the error message to the source of the dropped packet. In other words, the addresses in the segments of the segment lists may be associated with specific processing instructions for the packet rather than a specific network address to send the packet.

Figure 6:
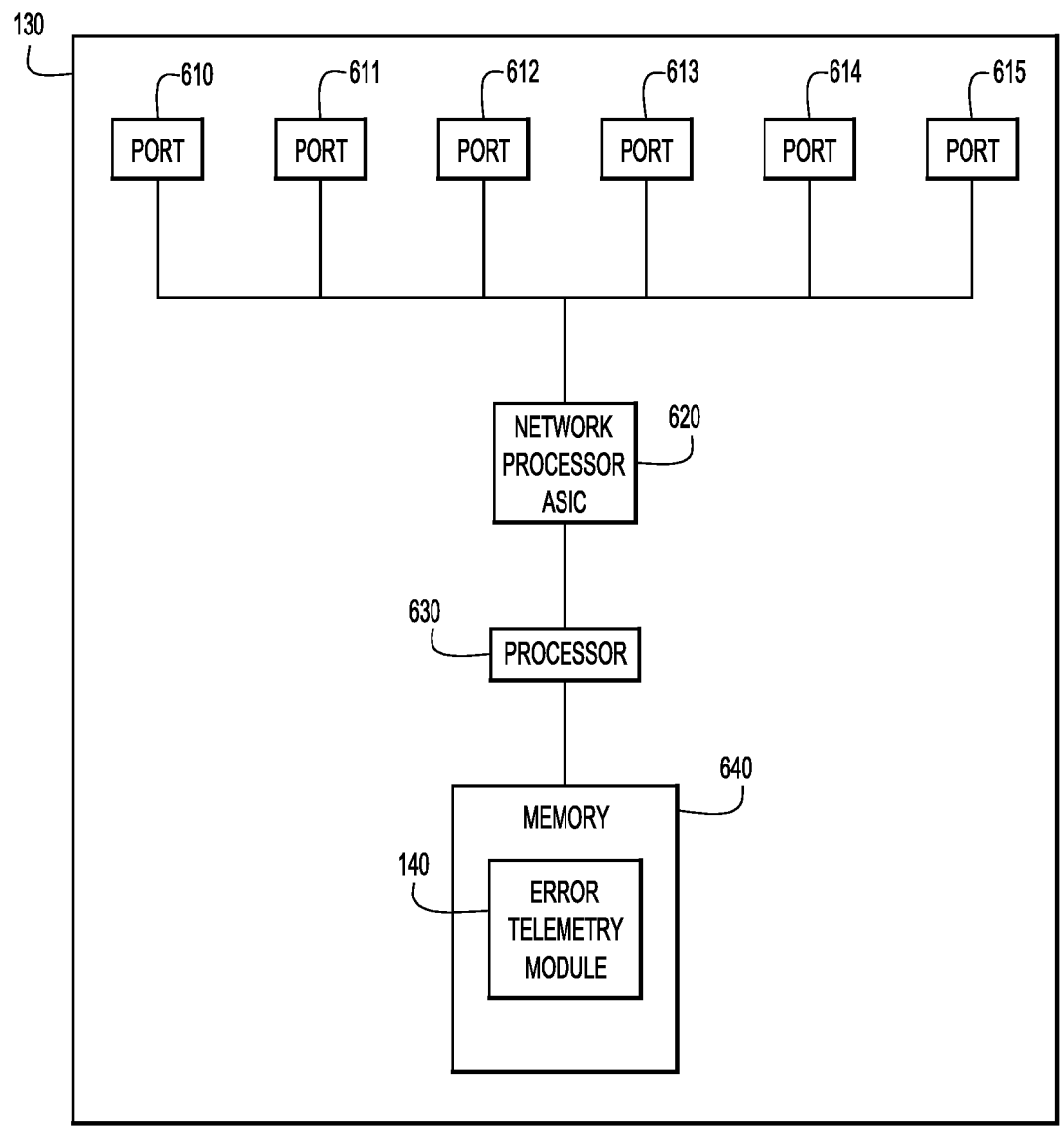
FIG. 6 is a simplified block diagram of a network device configured to perform error telemetry, according to an example embodiment.

Referring now to FIG. 6, a simplified block diagram illustrates a network device (e.g., transit node 130) that is configured to participate in the techniques presented herein. The networking device includes a network interface unit in the form of a plurality of network ports 610-615, a processor Application Specific Integrated Circuit (ASIC) 620 that performs network processing functions, one or more processors 630 (e.g., microprocessors or microcontrollers), and memory 640. The node 130 may include multiple processor ASICs to perform various network processing functions. The memory 640 stores the error telemetry module 140, which may include instructions for processing error/informational message, such as ICMP messages. It is to be understood that, in certain examples, the network device may be a virtual (software-based) appliance. The processor 630 performs higher level control functions of the node 130, in concert with functions of the network processor ASIC 620.

The memory 640 may include read only memory (ROM), random access memory (RAM), magnetic disk storage media devices, optical storage media devices, flash memory devices, electrical, optical, or other physical/tangible memory storage devices. Thus, in general, the memory 640 may comprise one or more tangible (non-transitory) computer readable storage media (e.g., a memory device) encoded with software comprising computer executable instructions and when the software is executed (by the one or more processors 630) it is operable to perform the operations described herein. For example, the memory 640 stores instructions for the error telemetry module 140 described above. When the processor executes the instructions for the error telemetry module 140, the processor is caused to control the node 130 to perform the operations described herein.

Figure 7:
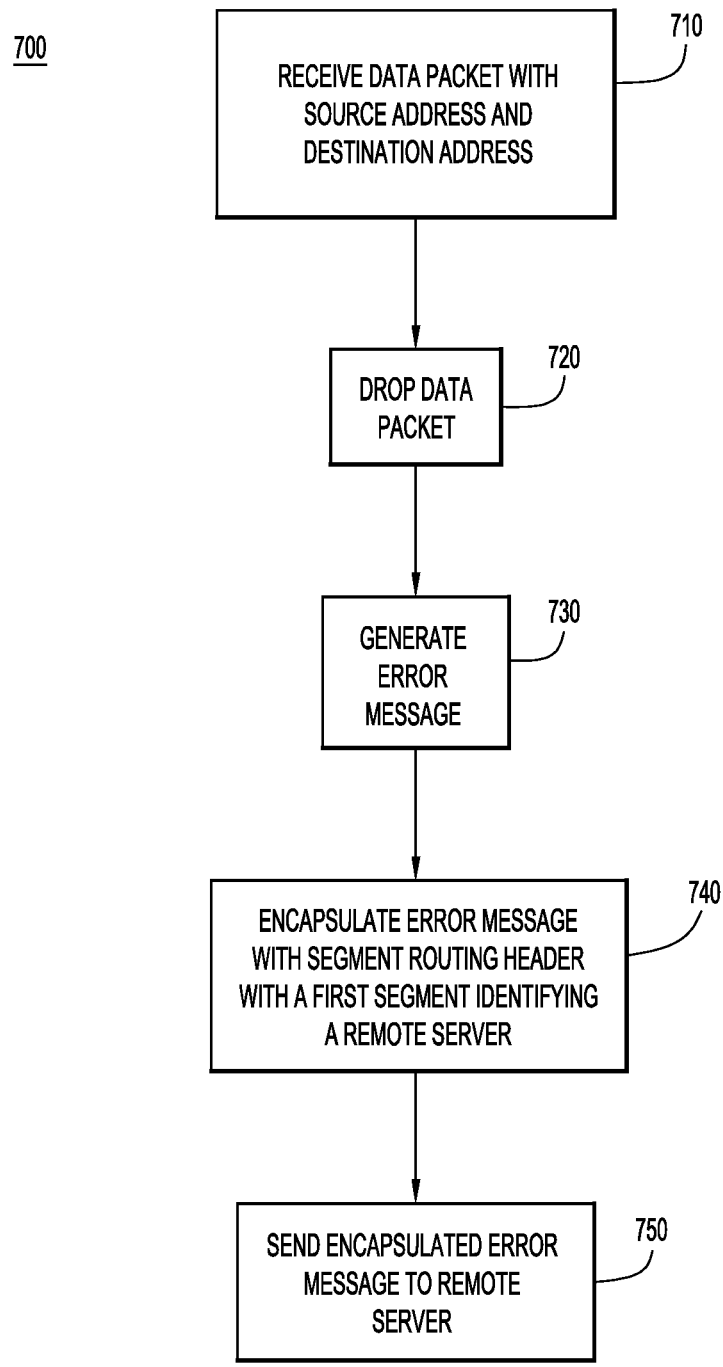
FIG. 7 is a flowchart depicting operations of a transit node sending error telemetry to a remote server, according to an example embodiment.

Referring now to FIG. 7, a flowchart illustrates a process 700 performed by a network device (e.g., transit node 130) in reporting error messages to a remote server (e.g., telemetry server 160). Initially, the network device receives a data packet in step 710. The data packet includes a source address and a destination address. In step 720, the network device drops the data packet before the data packet reaches the destination address. In one example, the network device may drop the packet due to the packet being too big, having an expired TTL, local egress buffering, or other local resource issues.

In step 730, the network device generates an error message indicating that the data packet has been dropped. In one example, the error message may be an ICMP message or other error message that includes contextual information related to the data packet and/or the network device. In step 740, the network device encapsulates the error message with a segment routing header. The segment routing header includes a plurality of segments, including a first segment that identifies a remote server. In step 750, the network device sends the encapsulated error message to the remote server based on the first segment of the segment routing header.

In summary, the techniques presented herein leverage an SRH concept to reporting network telemetry, which may be applicable for any network or payload. Leveraging the SRH enables advantages, such as choosing between different logging services based on specific metrics, crafting a specific path around a particular failure, crafting a loose path that always reaches the remote server, or M-Anycast solutions. The error telemetry techniques use a telemetry server that supports SRH and is configured to receive notifications of network errors, such as network traces or ICMP (or related error/informational) messages. The notifications are stored on the telemetry server for further processing and analysis. The telemetry server may store the notifications based on a bit/flag in the SRH or based on an instruction within the SRH. Alternatively, the telemetry server may be configured to store every error message/notification that it receives.

Any transit node, on generating an ICMPv4, ICMPv6, or other error/informational message for other overlay/underlay technology (e.g., SFC), encapsulates the message with an SRH. The SRH includes a segment list that will typically list at least two segments. The two segments may be listed in an order that causes the error message to be sent to the telemetry server and then toward the actual source of the packet that caused the error. Additionally, error messages may be generated for silently dropped packets that are directed only to the telemetry server. This logging of silent drops enables greater visibility to the network administrator without providing additional information to the source endpoint.

The techniques presented herein allow for collection of network error traces including actual packets of errors or packets that elicited errors. These network error traces may be processed to aid in troubleshooting, debugging, network optimization, or building a proactive analysis of errors. The error telemetry techniques provide increased network visibility in the case of resource exhaustion and/or firewall/policy dropped packets. The error telemetry is applicable to a wide range of network environments.

The techniques presented herein also provide for shimming instructions (e.g., copy the error message, store and index errors and attributes, rewrite destination, etc.) to a remote server on handling the error messages. This optimizes network bandwidth usage by using one packet to report the error to the telemetry server and the original source of the packet eliciting the error. The transit node adds steering instructions to the relevant header and forwards the error message to the telemetry server. In scenarios involving silent drops or exceptions with no error reporting, the transit node extends the error reporting by generating a new error message (e.g., including the dropped packet) with additional details to the telemetry server. In another example, the data plane programming of the telemetry server enables a semantic defined by a flag in the header. IN other words, a flag in the header defines whether the reported error message should be logged and forwarded or logged and dropped.

In one form, a method is provided for a network device. The method comprises receiving a data packet at the network device. The data packet includes a source address and a destination address. The method also includes dropping the data packet before it reaches the destination address and generating an error message indicating that the data packet has been dropped. The method further includes encapsulating the error message with a segment routing header comprising a plurality of segments. A first segment of the plurality of segments identifies a remote server. The method also includes sending the encapsulated error message to the remote server based on the first segment of the segment routing header.

In another form, an apparatus is provided comprising a network interface unit and a processor. The network interface unit is configured to receive a data packet with a source address and a destination address. The processor is configured to drop the data packet before it reaches the destination address and generate an error message indicating that the data packet has been dropped. The processor is also configured to encapsulate the error message with a segment routing header comprising a plurality of segments. A first segment of the plurality of segments identifies a remote server. The processor is further configured to cause the network interface unit to send the encapsulated error message to the remote server based on the first segment of the segment routing header.

In still another form, one or more non-transitory computer readable storage media encoded with software comprising computer executable instructions and, when the software is executed by a processor on a network device, operable to cause the processor to receive a data packet with a source address and a destination address. The instructions also cause the processor to drop the data packet at the network device before it reaches the destination address and generate an error message indicating that the data packet has been dropped. The instructions further cause the processor to encapsulated the error message with a segment routing header comprising a plurality of segments. A first segment of the plurality of segments identifies a remote server. The instructions also cause the processor to send the encapsulated error message to the remote server based on the first segment of the segment routing header.

The above description is intended by way of example only. Although the present disclosure has been described in detail with reference to particular arrangements and configurations, these example configurations and arrangements may be changed significantly without departing from the scope of the present disclosure. In particular, while Segment Routing Headers have been used as an example to direct the error messages to the remote telemetry server, other protocol headers may be used, such as Network Service Headers, stacks of MPLS labels, or a pointer of IPv6 extension headers.

What is claimed is:

1. A method comprising:
   at a network device, receiving a data packet with a source address and a destination address;
   dropping the data packet at the network device before it reaches the destination address;
   generating an error message indicating that the data packet has been dropped;
   encapsulating the error message with a segment routing header comprising a plurality of segments, the plurality of segments including a first segment that identifies a remote server and a second segment that causes the remote server to record the error message; and
   sending the encapsulated error message to the remote server based on the first segment of the segment routing header.

2. The method of claim 1, wherein the plurality of segments is a plurality of addresses or a plurality of instructions.

3. The method of claim 1, wherein the plurality of segments further includes a third segment that identifies the source address of the data packet.

4. The method of claim 1, wherein the error message includes at least a portion of the data packet.

5. The method of claim 1, wherein the encapsulated error message includes information descriptive of a reason that the network device dropped the data packet.

6. The method of claim 5, wherein the segment routing header of the encapsulated error message includes the information descriptive of the reason that the network device dropped the data packet.

7. The method of claim 4, wherein the segment routing header includes a flag to signal the remote server to generate a new error message based on the portion of the data packet.

8. An apparatus comprising:
   a network interface unit configured to receive a data packet with a source address and a destination address; and
   a processor configured to:
      drop the data packet before it reaches the destination address;
      generate an error message indicating that the data packet has been dropped;
      encapsulate the error message with a segment routing header comprising a plurality of segments, the plurality of segments including a first segment that identifies a remote server and a second segment that causes the remote server to record the error message; and
      cause the network interface unit to send the encapsulated error message to the remote server based on the first segment of the segment routing header.

9. The apparatus of claim 8, wherein the plurality of segments is a plurality of addresses or a plurality of instructions.

10. The apparatus of claim 8, wherein the plurality of segments further includes a third segment that identifies the source address of the data packet.

11. The apparatus of claim 8, wherein the processor is configured to generate the error message to include at least a portion of the data packet.

12. The apparatus of claim 11, wherein processor is configured to include a flag in the segment routing header to signal the remote server to generate a new error message based on the portion of the data packet.

13. The apparatus of claim 8, wherein the encapsulated error message includes information descriptive of a reason that the apparatus dropped the data packet.

14. The apparatus of claim 13, wherein the segment routing header of the encapsulated error message includes the information descriptive of the reason that the apparatus dropped the data packet.

15. One or more non-transitory computer readable storage media encoded with software comprising computer executable instructions and, when the software is executed by a processor on a network device, operable to cause the processor to:
   receive a data packet with a source address and a destination address;
   drop the data packet at the network device before it reaches the destination address;
   generate an error message indicating that the data packet has been dropped;
   encapsulate the error message with a segment routing header comprising a plurality of segments, the plurality of segments including a first segment that identifies a remote server and a second segment that causes the remote server to record the error message; and send the encapsulated error message to the remote server based on the first segment of the segment routing header.

16. The non-transitory computer readable storage media of claim 15, wherein the plurality of segments further includes a third segment that identifies the source address of the data packet.

17. The non-transitory computer readable storage media of claim 15, wherein the error message includes at least a portion of the data packet.

18. The non-transitory computer readable storage media of claim 15, wherein the encapsulated error message includes information descriptive of a reason that the network device dropped the data packet.

19. The non-transitory computer readable storage media of claim 18, wherein the segment routing header of the encapsulated error message includes the information descriptive of the reason that the network device dropped the data packet.

20. The non-transitory computer readable storage media of claim 15, wherein the plurality of segments is a plurality of addresses or a plurality of instructions.

* * * * *